J. GOW, DEC'D.
H. W. PHILBROOK & A. M. LOUDON, ADMINISTRATORS.
MOLDING MACHINE.
APPLICATION FILED AUG. 18, 1910.

1,077,930.  Patented Nov. 4, 1913.
4 SHEETS—SHEET 4.

WITNESSES:
M. E. Verbeck.
Fred Call

INVENTOR
John Gow
BY
Eugene Diven
ATTORNEY

UNITED STATES PATENT OFFICE.

JOHN GOW, OF SCHENECTADY, NEW YORK, ASSIGNOR OF ONE-HALF TO ARCHIBALD M. LOUDON, OF ELMIRA, NEW YORK; HORACE W. PHILBROOK AND ARCHIBALD M. LOUDON, ADMINISTRATORS OF SAID GOW, DECEASED.

MOLDING-MACHINE.

1,077,930.  Specification of Letters Patent.  Patented Nov. 4, 1913.

Application filed August 18, 1910. Serial No. 577,822.

*To all whom it may concern:*

Be it known that I, JOHN GOW, a citizen of the United States, residing at Schenectady, in the county of Schenectady and State of New York, have invented certain new and useful Improvements in Molding-Machines, of which the following is a specification.

This invention relates to improvements in molding machines of the rock-over type; and the objects of my invention are to provide clamping means on the mold carrier whereby the pattern carrying member of a core box or flask may be quickly and securely fastened upon the carrier, and released therefrom; to provide means for automatically releasing the bottom board clamp when the mold is rocked over above the withdrawing rest; to provide certain improvements in said withdrawing rest; and, finally, to provide, in general, improvements in the machine whereby it may be readily manipulated by a single operative.

I attain my objects by constructing the machine in the manner illustrated in the accompanying drawings, in which—

Figure 1:
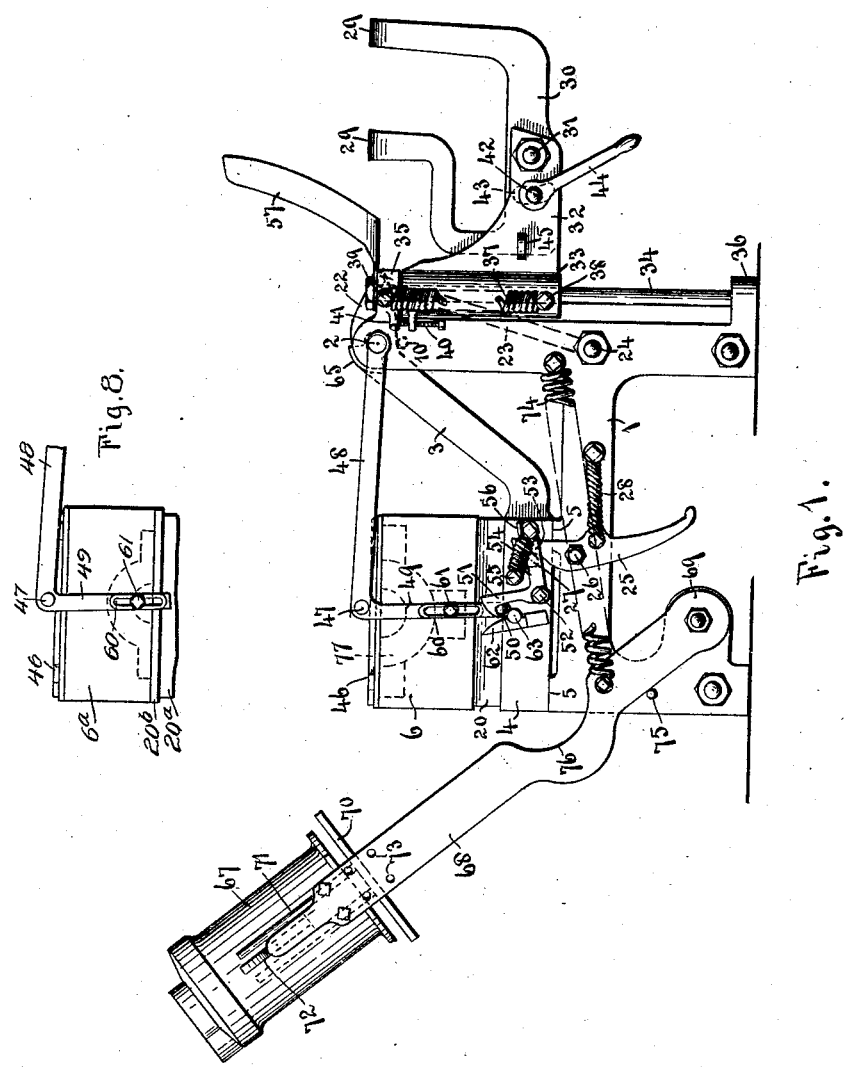
Figure 2:
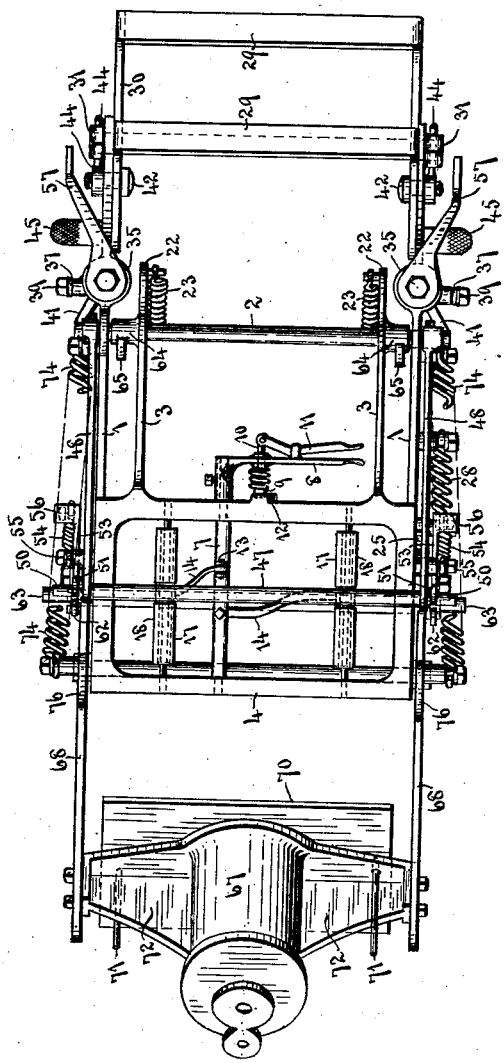
Figure 3:
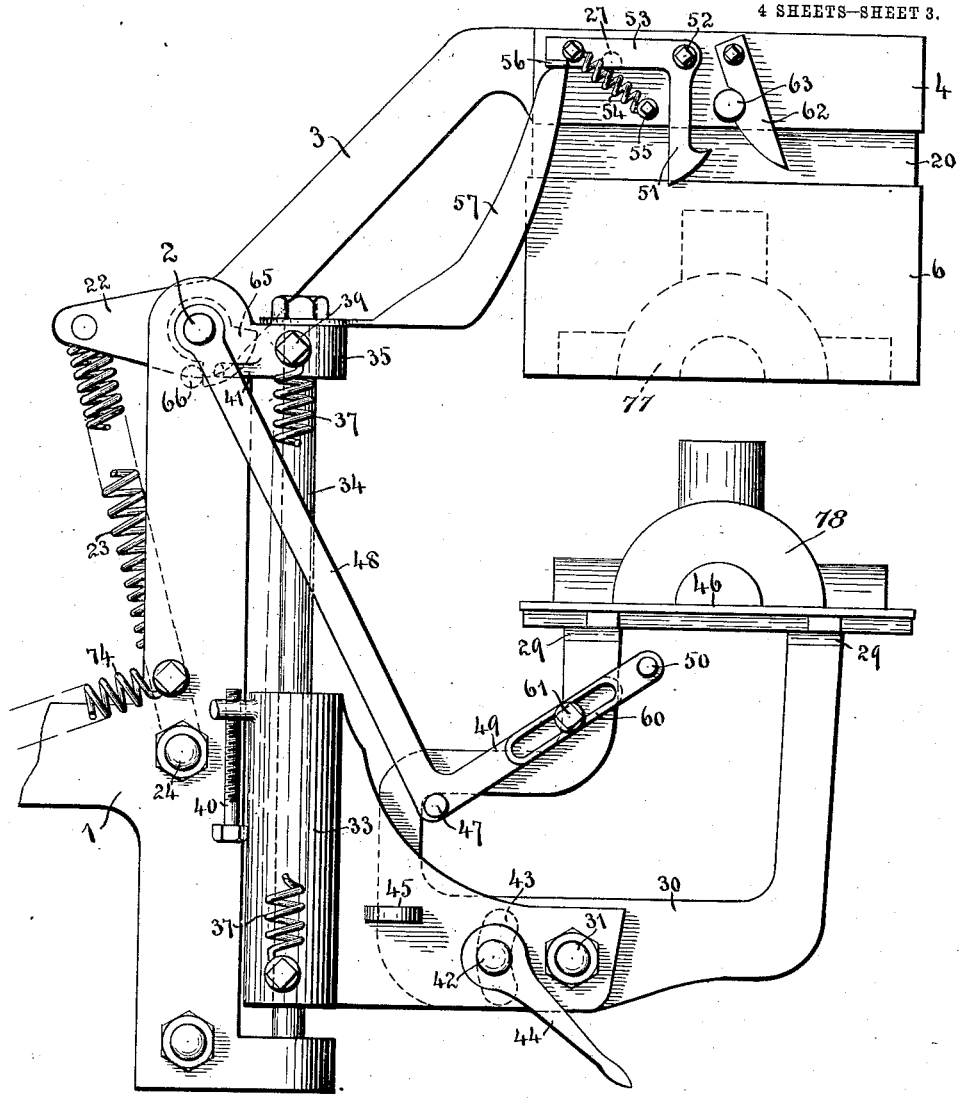
Figure 4:
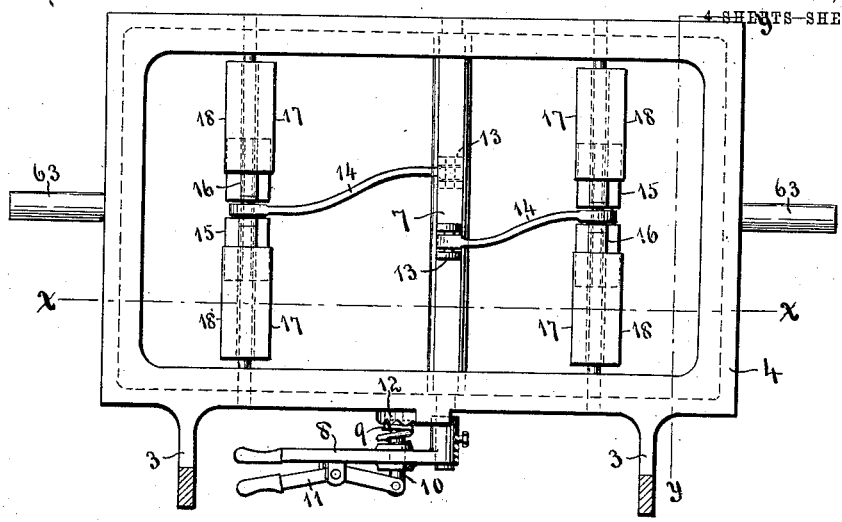
Figure 5:
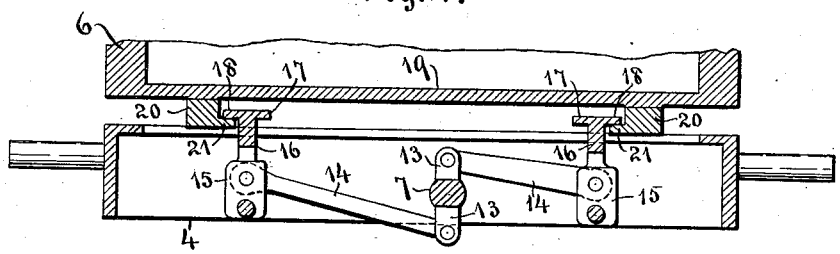
Figure 6:
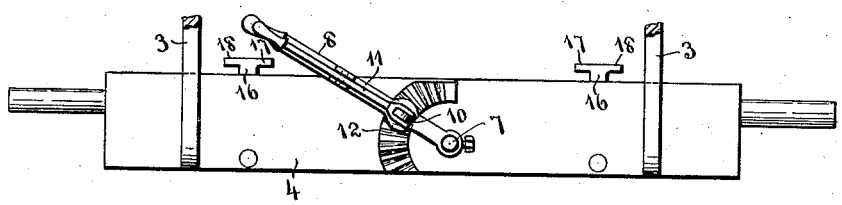
Figure 7:
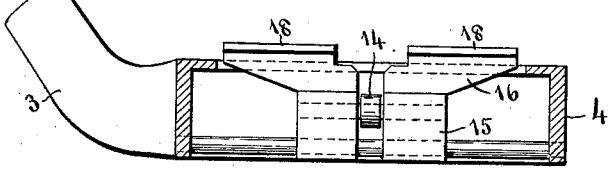

Figure 1 shows the machine in side elevation; Fig. 2, a plan view thereof; Fig. 3, a side elevation upon a larger scale showing the right hand portion of the machine, as viewed in Fig. 1, with the parts in the position assumed thereby when withdrawing a finished core or mold from the carrier, the bottom board being shown released from the carrier and drawn downward on the receiving rest; Fig. 4, a detail showing a plan view of the mold carrier; Fig. 5, a transverse section thereof on the line *x—x* in Fig. 4; Fig. 6, a side elevation of the carrier showing the clamp operating lever; Fig. 7, a section of the carrier on the line *y—y* in Fig. 4; and Fig. 8 is a detail view of parts as shown in Fig. 1 and with a mold flask substituted for the core box shown in Fig. 1.

Like numerals designate like parts in the several views.

The machine parts are supported on a pair of side frames 1, 1, fastened together by suitable cross connecting braces or bars. Upon a cross bar 2, at the top arms 3 are pivotally mounted, to which arms the mold carrier 4 is fastened. This carrier, when in receiving position, rests upon suitable supports 5, provided therefor on the frame members 1. To this carrier the pattern carrying member of a core box, shown at 6, or a pattern plate and half flask, as the case may be, are fastened by a clamping device, the details of which are more fully illustrated in Figs. 4 to 7. This clamping device comprises a rock shaft 7, pivotally mounted in the side members of the carrier frame, said shaft being operated by means of a lever 8 fastened to said shaft at one side of the carrier frame, and provided with a latch block 9, carried by a pin 10, passing through a guide opening formed in the lever 8, and operated by a latch lever 11, pivoted upon the lever. The latch block engages teeth upon a segmental rackplate 12, fastened upon the side of the carrier; whereby the rock shaft, when thrown to the right or left will be locked in desired position. A spring coiled around the stem between the latch block and lever normally holds the block in engagement with the rack teeth. The rock shaft is provided with diametrically opposite arms 13, to which are coupled links 14, which in turn are coupled to rock bars 15, pivotally mounted in the sides of the carrier. These rock bars are provided with upward extensions 16, provided with oppositely disposed flanges 17, and 18, along their upper edges. These flanged extensions project above the top of the carrier; and the bottom 19 of a pattern carrying member of a core box or flask, (which in the latter case is the pattern plate), is provided with cross bars or cleats 20, having on their lower edges flanges or tongues 21, adapted to be engaged by the flanges on the extensions 16, as shown more clearly in Fig. 5. To release this pattern carrying member from the carrier, the latch on lever 8 will be thrown out of engagement with the rack; and the lever turned downward, or to the left, as it is shown in Fig. 6; thereby moving the rock bars 15 toward one another, and withdrawing the flanges 18 from engagement with the tongues 21, after which a change of flasks or core boxes may be quickly effected, and the new pattern carrying member securely locked in place by reversing the movement of the clamping mechanism. Should it be required to place upon the carrier a core box or pattern plate of smaller size the cleats 20 on such box or plate will be positioned between the flanges 17, with their tongues 21 pointing outward, and the clamping of the parts together will be attained by throwing the rock arms 15 away from one another to permit of the placing of the cleats upon the carrier, thereafter moving the lever 8 in the direction to draw the arms together and force the flanges 17 upon the tongues. I do not wish, however, to be understood to limit myself to any particular construction or arrangement of this clamping device.

To counterbalance the weight of the carrier and the mold, the carrier arms 3 are provided with extensions 22, from which springs 23 are carried to one of the cross connecting bars at 24, or to other suitable points of attachment on the frame. To prevent the upward movement of the carrier when placed in receiving position upon the supports 5, I provide a latch 25, which is shown in Fig. 1 as pivoted at 26 upon the side frame, said latch being provided at its upper end with a hook adapted to engage a pin 27 projecting from the side of the carrier. This latch is actuated and retained in locking position by means of a spring 28, so that, when the carrier is thrown over into receiving position the latch will operate automatically to engage the pin 27; the latch being thrown out of engagement with said pin by the operative's foot when the carrier and its flask or mold box are to be thrown over into discharging position over the bottom board receiving rest at the opposite side of the pivot bar 2. This receiving rest consists, as herein shown, of two cross bars 29, from which skeleton side plates 30 extend downward and are pivotally mounted at 31 upon brackets 32, which project from sleeves 33, slidably mounted on the vertical guide bars 34 fastened to upper and lower extensions 35 and 36, respectively, of the side frames 1. The sleeves 33 are supported and held in their normal position by springs 37, which are connected to the sleeves at their lower ends at 38, and to the extensions 35 at their upper ends at 39. To adjust the point of elevation of the rest I provide the sleeves 33 with adjusting screws 40, the upper ends of which engage stops 41, which project from the extensions 35 at the top of the side plates.

As, in many cases it is necessary to place the receiving rest at an angle to the horizontal, I provide on the brackets 32 clamping bolts 42, which pass through curved slots 43 on the sides 30 of the rest, said bolt being provided with clamping nuts 44, for securing the rest in adjusted position. This construction and arrangement insures that a core may be withdrawn from a mold, or a flask from its pattern plate without danger of causing injury to the core or mold as frequently results when the rest is so supported that it is adapted to rock or turn. At 45 the side bars 32 are provided with projections to be engaged by the foot of the operative to push the rest downward when withdrawing a core or mold from the carrier.

After the core box or half flask has been filled and rammed up with the proper core mixture or molding sand, a bottom board 46 is placed in position thereover, and fastened upon the box or flask by means of a cross bar 47, carried by arms 48, pivotally mounted upon the ends of the pivot bar 2, where they project beyond the side frames 1. These arms 48 are provided with downward extensions 49 at the lower ends of which pins 50 project, said pins being engaged by the hooked ends of latch levers 51, pivotally mounted at 52 on opposite sides of the carrier 4, and having arms 53, from which springs 54 run to fastening points 55 upon the sides of the carrier. These arms 53 are provided with outward projections at 56, which, when the carrier is thrown over to the right, are engaged by upwardly projecting arms 57, fastened to the side frames, whereby the latches will be actuated to release the pins 50, as shown in Fig. 3. In order to adjust the distance between the clamping bar 47 and the pins 50 to different heights of core boxes or flasks, the arms 49 are made in two parts, one of which, at 60, is slotted, and the other of which is provided with a clamping nut, or bolt, 61. At 62 the carrier is provided with guide pieces by which the pins 50, when the clamping bar is thrown down, are guided into position to be engaged by the latches 51. At 63 the carrier is provided with outwardly projecting pins or handles, whereby it may be grasped by the operative in throwing it from one position to the other, these pins also serving another purpose, as will hereafter appear.

When the carrier is thrown over to the right, as shown in Fig. 3, into discharging position, it must be held in such position while the bottom board is drawn downward by the depression of the receiving rest. To accomplish this I provide the hubs 64 on the arms 3, with segments 65, which, when the carrier is thrown over to discharging position, are engaged by pins at 66, which project inwardly from the side frames 1, (see Fig. 3).

To permit the clamping bar 47 to drop away from the bottom board when the pins 52 are released from the latches 51, the sides of the rest are cut out into the skeleton form shown, so that the clamping bar may swing down into the position shown in Fig. 3, through its arc of travel around the pivot bar 2.

For ramming up the mold, the machine is provided with a pneumatically operated piston in a cylinder 67, mounted upon supporting bars 68, pivoted at 69 upon the side frames. The piston operates a ramming plate 70, in the usual manner, said plate being held from turning during its reciprocations by means of guide pins 71, which pass upwardly through the flanged webs 72, by which the cylinder is fastened to the bars 68. The bars 68 are also provided with a series of bolt holes at 73, by which the cylinder webs 72 may be fastened in different positions thereon, to adjust the ramming plate 70 to different heights of core boxes or flasks. The weight of the ram, when swung outward to clear the carrier is counterbalanced in part by a spring 74, and the bars 68 are supported in their outward positions by stop pins 75, projecting from the side frames. When moved into ramming position the portions 76 of the bars bring up against the pins 63 and are held thereagainst by the tension of springs 74.

Having thus described the several parts of my machine, the operation thereof will be readily understood as follows: After a core box, or a pattern plate and its half flask, have been placed in position upon the carrier, and fastened in place by the clamping device, the core composition or molding sand will be thrown into the mold and rammed up in the usual manner. The ram will then be thrown over to the left, as in Fig. 1, and a bottom board 46 placed in position over the core box or flask and locked thereon by throwing the clamping bar 47 over from the position shown in Fig. 3 to the position shown in Fig. 1, this locking of the clamping bar in place being, as heretofore described, attained by means of the spring latches 51, two of which are preferably used, one on each side of the machine. Heretofore this clamping bar 47 has been held in position by two operatives, one on each side of the machine, said operatives grasping the pins 50 and 63, and holding them together as they turn the carrier over into discharging position. By means of my automatic locking device the service of one operative may be dispensed with, since the machine may be manipulated entirely from one side. The machine might still be manipulated by one man by applying the latch mechanism to one side only of the carrier. After the clamping bar 47 is in position, the carrier will be released by pressing the foot against the latch 25, when it will start in its upward movement by reason of the tension of the springs 23 on the projections 22 of the arms 3; the operative then grasping the pin 63, or other part of the carrier, to continue the travel of the carrier. As the carrier approaches its discharging position the vertical arms 57 will engage the projections 56 on the latch arms 53, thereby automatically releasing the pins 50, as the bottom board is brought into position upon the cross bars 29 of the receiving rest. The operative then pushes down with his foot upon the projection 45, thereby withdrawing the bottom board, and with it the core from the core box; or the half flask from the pattern plate, as the case may be, in perfect alinement with the direction of discharge; the core or mold coming smoothly and perfectly away from the core box, or pattern, as the case may be.

This machine is especially adapted for making large cores, and in the drawings the element 6 represents a core box adapted to mold a half core of the shape indicated by the broken lines at 77, the completed half core being shown withdrawn from the core box at 78 in Fig. 3.

In Fig. 8 I have shown a flask 6ª and a pattern carrying member 20ᵇ, the latter being secured to the cleats 20ª which correspond in every respect with the cleats 20 shown in Fig. 1. When a flask is used as shown in Fig. 8, the board 20ᵇ carrying the pattern will be separated from the flask 6ª carrying the mold when rocked over on to the rest and the pattern carrying member or board 20ᵇ with the pattern secured thereto will be carried back to the position shown in Fig. 1. It will thus be seen that the mechanism is equally well adapted for use in making cores or in making molds.

Without confining myself to the details of construction herein described, as many changes therein may be made without departing from the spirit of my invention, what I claim and desire to secure by Letters Patent is—

1. A molding machine having a rock-over mold carrier and means on the carrier for fastening the pattern carrying member of a core box or flask thereon comprising two oppositely disposed flanged cross bars susceptible of movement to adjust the distance between the flanged portions thereof, in combination with interlocking means on said member adapted to be engaged by said flanges.

2. A molding machine having a rock-over mold carrier and means on the carrier for fastening the pattern carrying member of a core-box or flask thereon comprising two oppositely disposed flanged cross bars adapted to rock laterally, means for simultaneously rocking the bars in opposite directions, in combination with interlocking means on said member adapted to be engaged by the bars, and means for locking the bars against movement when so engaged.

3. A molding machine having a rock-over mold carrier and means on the carrier for fastening the pattern carrying member of a core-box or flask thereon comprising two rock bars having flanges projecting from their upper edges, a rock-shaft mounted between and parallel to said bars, links connecting the shaft to the bars in a manner to move the bars simultaneously in opposite directions, means for turning the shaft, and a locking device for fastening the shaft in different angular positions, in combination with interlocking means on said member adapted to be engaged by said flanges.

4. A molding machine having a rock-over mold carrier, in combination with a bottom-board clamp comprising a cross-bar carried between arms hinged to swing around the rock-over pivot as a center, projections on said arms extending from adjacent the cross-bar to the carrier at opposite sides of a core-box or flask when positioned thereon, pins on the ends of said projections, a snap latch on one or both sides of the carrier to engage one or both pins, and means for actuating the latch or latches to release the clamping bar when the carrier is thrown over into discharging position.

5. A molding machine having a rock-over mold carrier, in combination with a bottom-board clamp comprising a cross-bar carried between arms hinged to swing around the rock-over pivot as a center, means for fastening the bar to the carrier when in position over a core-box or flask attached to the carrier, and means for automatically releasing the bar when the carrier is thrown over into discharging position.

6. A molding machine having a rock-over mold carrier, in combination with a bottom-board clamp comprising a cross-bar carried between arms hinged to swing around the rock-over pivot as a center, lateral extensions on said arms adjacent the cross-bar adjustable in length and provided with pins on their free ends, a latch on one or both sides of the carrier adapted to engage one or both of said pins, and means for automatically actuating the latch or latches to release the pin or pins when the carrier is thrown over into discharging position.

7. A molding machine having a rock-over mold carrier, in combination with a bottom-board clamp comprising a cross-bar carried between arms hinged to swing around the rock-over pivot as a center, a receiving rest vertically movable beneath the carrier when thrown over into discharging position, said rest being provided with cross and side openings to permit the cross-bar to swing down and away from beneath the bottom-board when the rest is depressed, and means for holding the rest normally in elevated position.

8. A molding machine having a rock-over mold carrier, in combination with a receiving rest positioned beneath the carrier when thrown over into discharging position, vertical guide rods on each side of the machine, sleeves adapted to slide on said rods, brackets on said sleeves between which the rest is mounted with a pivotal connection so as to be tilted at an angle to the horizontal, means on the brackets for locking the rest in angular adjustment, and means for holding the sleeves normally in elevated position.

9. In a molding machine, the combination with a rock-over mold carrier, of a pattern carrying member of a core box or flask detachably supported on said carrier and having hook-like means projecting from the wall thereof adjacent the carrier, pivotally mounted arms on the carrier having flanges adapted to coöperate with said hook-like devices to connect the pattern carrying member and mold carrier, and means for rocking said arms.

10. A molding machine embodying therein a rockover mold carrier, and means on the carrier for fastening the pattern carrying member of a core box or flask thereon, comprising two parallel members movable toward or from each other to adjust the distance therebetween, in combination with interlocking means on said pattern carrying member and on said movable members respectively, said means being arranged divergently and in parallelism, and means common to both of said members for imparting simultaneous movement thereto, whereby said interlocking means may be engaged or disengaged from each other to secure said pattern carrying member to said mold carrier, and simultaneously true up said pattern carrying member on said carrier.

11. A molding machine embodying therein a rockover mold carrier, a support therefor, a drawing table oppositely disposed as to said support, the pivots of said mold carrier being arranged intermediate said support and said drawing table, means whereby said mold carrier may be locked in position upon said support, a ram movably mounted with relation to said support whereby said ram may be brought into the operative relation to a mold or flask and removed from said position to permit said carrier to be rocked over, means movable with said carrier and independently thereof for securing a bottom board upon a mold or flask during the period when said carrier is being rocked, and a latch mechanism, the coöperating parts of which are carried by said last named means and said mold carrier whereby said last named means may be disengaged from said carrier to permit the drawing of the pattern or mold.

In testimony whereof I have affixed my signature, in presence of two witnesses.

JOHN GOW.

Witnesses:
J. H. MEEHAN,
S. H. PERVAULT, JR.